United States Patent [19]

Tacchi et al.

[11] Patent Number: 5,564,893
[45] Date of Patent: Oct. 15, 1996

[54] PICKUP AND FEED UNIT FOR STACKS OF BLANKS

[75] Inventors: Alver Tacchi; Alessandro Minarelli, both of Bologna, Italy

[73] Assignee: G.D. Societa'Per Azioni, Bologna, Italy

[21] Appl. No.: 254,132

[22] Filed: Jun. 6, 1994

[30] Foreign Application Priority Data

Jun. 16, 1993 [IT] Italy .................................. BO93A0270

[51] Int. Cl.⁶ .................................................. B65G 59/04
[52] U.S. Cl. ........................................ 414/796.9; 414/797
[58] Field of Search ............................. 414/788.9, 795.7, 414/796.9, 797, 907, 796.4; 901/16

[56] References Cited

U.S. PATENT DOCUMENTS

| | | | |
|---|---|---|---|
| 4,189,137 | 2/1980 | Denney et al. ........................ | 414/797 |
| 5,100,286 | 3/1992 | Anderson ................................. | 901/16 |
| 5,102,292 | 4/1992 | Brinker et al. ......................... | 414/796 |
| 5,169,284 | 12/1992 | Berger et al. ........................... | 414/907 |
| 5,190,430 | 3/1993 | Neri et al. ............................... | 414/797 |

*Primary Examiner*—Karen Merritt
*Assistant Examiner*—Douglas Hess
*Attorney, Agent, or Firm*—Klauber & Jackson

[57] ABSTRACT

A pickup and feed unit for stacks of blanks, wherein a movable pickup head provides for successively picking up the stacks off a pallet, on which the stacks are arranged and oriented in a given manner, and for feeding them to a receiving member. The head presents a frame oriented in a given manner in relation to the receiving member; and a pickup device with suction cups, rotating in relation to the frame and about a vertical axis, so that the stacks, once picked up, are always oriented the same way in relation to the frame and the receiving member.

8 Claims, 5 Drawing Sheets

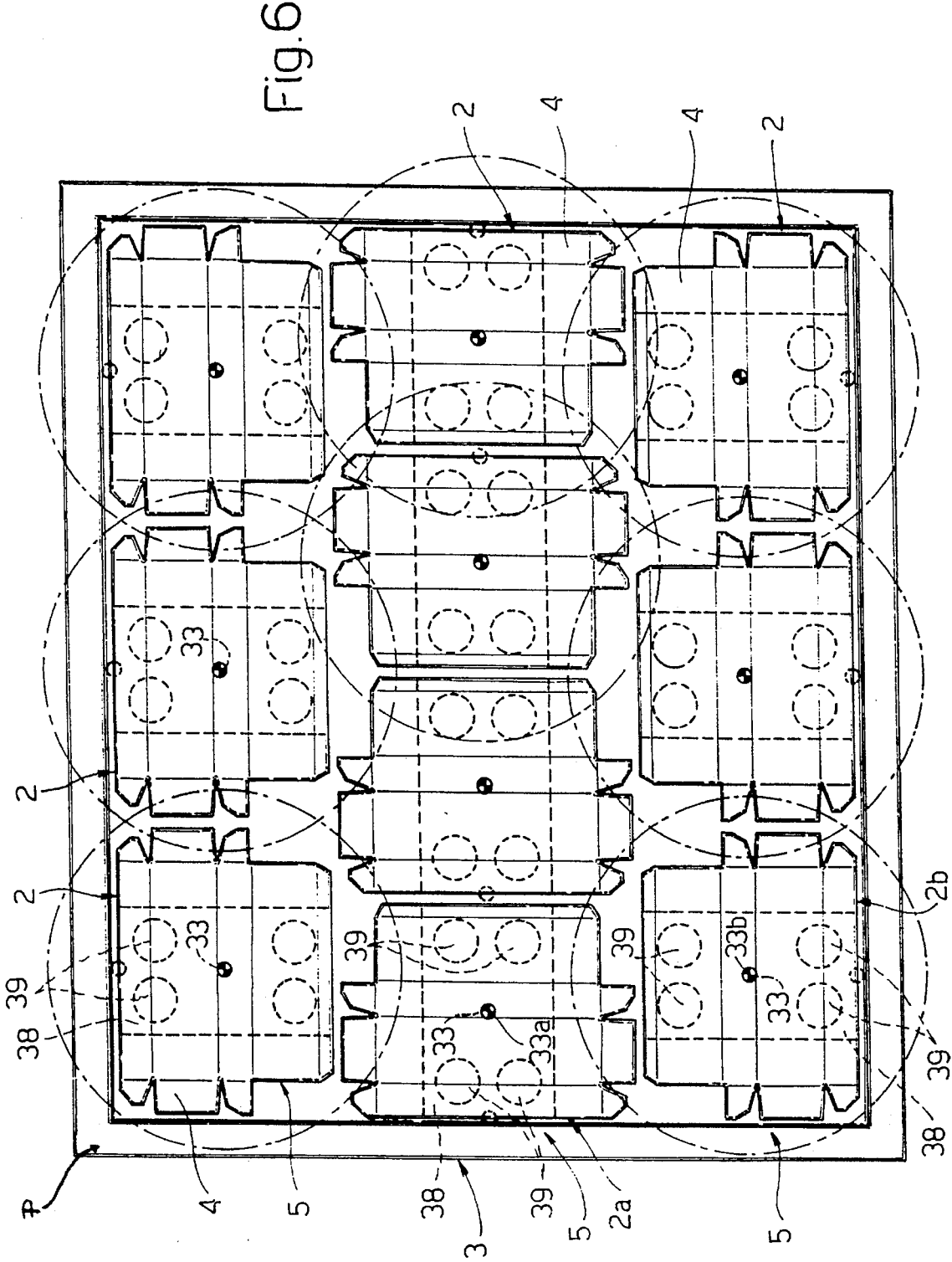

5,564,893

PICKUP AND FEED UNIT FOR STACKS OF BLANKS

BACKGROUND OF THE INVENTION

The present invention relates to a pickup and feed unit for stacks of blanks.

In particular, the present invention relates to a unit which may be used to advantage for successively picking up stacks of blanks off a supporting surface—normally defined by a pallet on which the stacks are placed next to one another, and arranged and oriented in known orderly manner—and feeding the stacks, with the same given orientation, to a receiving member at an unloading station.

Known pickup and feed devices for stacks of blanks comprise a powered pickup head for positively engaging the stack, and which is normally guided along three perpendicular axes: two horizontal axes parallel to the stack supporting surface; and one vertical axis perpendicular to the supporting surface.

Though satisfactory in applications in which the stacks are all equioriented in relation to the supporting surface and as required at the unloading station, a major drawback of known devices of the aforementioned type is that they are unsuitable for applications in which, due to the shape of the blanks, and for best exploiting the space available on the supporting surface, the stacks are oriented differently, in relation to one another, about the respective axes perpendicular to the supporting surface.

SUMMARY OF THE INVENTION

It is an object of the present invention to provide a straightforward, low-cost, highly reliable pickup unit designed to overcome the aforementioned drawback.

According to the present invention, there is provided a pickup and feed unit for stacks of blanks, the unit comprising a powered pickup head, and a receiving member; the head being movable in space, and comprising a frame oriented in given manner in relation to the receiving member, and pickup means, preferably suction cup type pickup means, for successively picking up stacks off a supporting surface on which the stacks are arranged and oriented in a given manner; characterized in that the pickup means are rotatable, in relation to the frame, about a vertical axis, so that the stacks, once picked up, are always oriented the same way in relation to the frame and the receiving member.

According to a preferred embodiment of the above unit, the frame comprises an element movable to and from an operating position facing the pickup means, and for supporting a stack carried by the pickup means.

BRIEF DESCRIPTION OF THE DRAWINGS

A non-limiting embodiment of the present invention will be described by way of example with reference to the accompanying drawings, in which:

FIG. 6 shows a plan view of a further detail in FIG. 1.

DETAILED DESCRIPTION OF THE INVENTION

Figure 1:
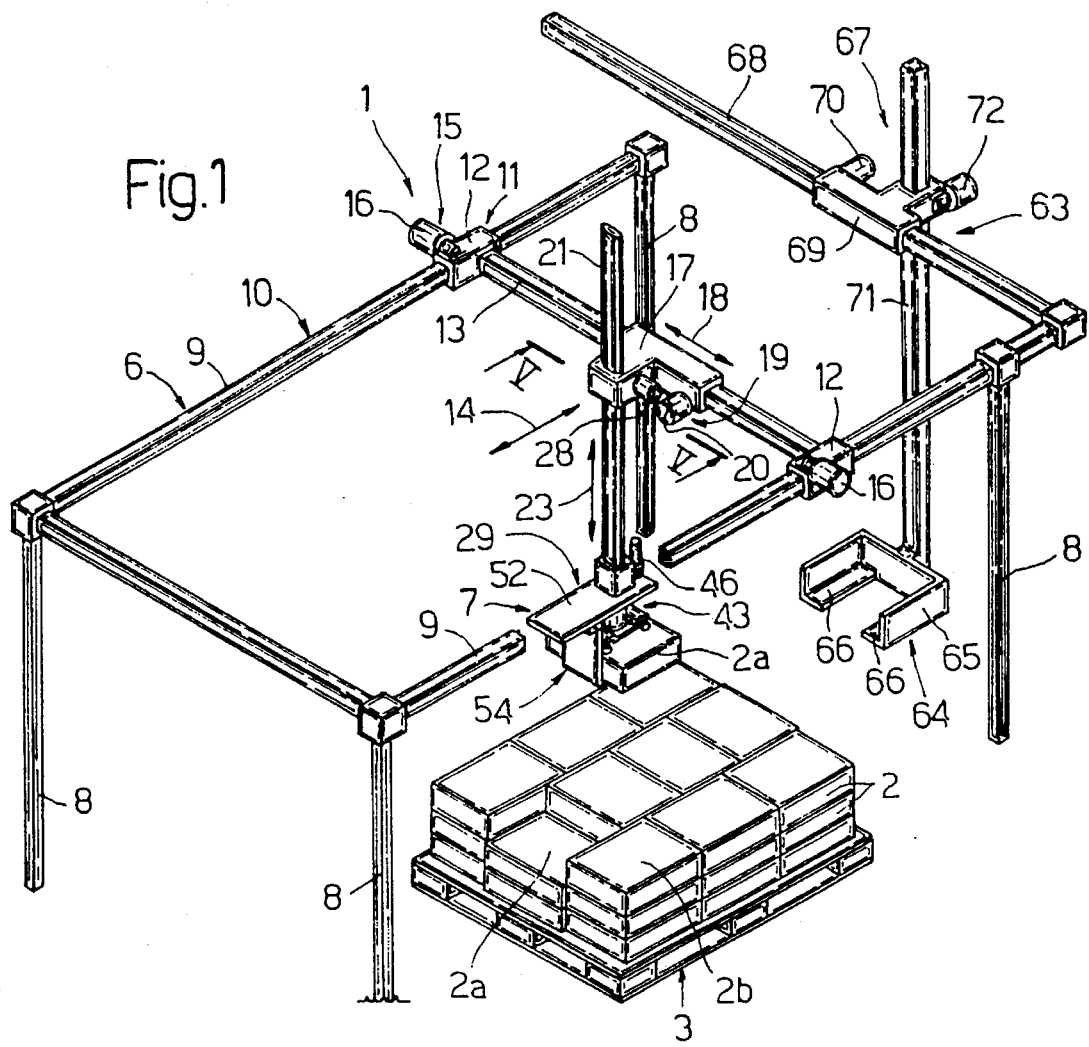
FIG. 1 shows a view in perspective of a preferred embodiment of the unit according to the present invention.

Number 1 in FIG. 1 indicates a unit for picking up and feeding stacks 2 arranged next to one another on a pallet 3, and each defined by a number of precut blanks 4 held together by a band (not shown). In the example shown in FIG. 6, stacks 2 on pallet 3 are arranged in layers and in three parallel rows 5; and, to better exploit the space on pallet 3 as a function of the shape of blanks 4, the stacks 2 in each row 5 are rotated, in relation to stacks 2 in the other rows 5, by a given angle, normally equal to a whole multiple of 90°, about an axis perpendicular to the supporting surface P of pallet 3.

As shown in FIG. 1, unit 1 comprises a supporting structure 6, and a pickup head 7 traveling on structure 6 and which provides for positively engaging each stack 2. Structure 6 comprises four posts 8 arranged about pallet 3 and having respective top end portions connected by two horizontal rods 9 parallel to each other and to surface P. Rods 9 form the guide 10 of a slide 11 which comprises two sleeves 12 fitted in sliding manner to respective rods 9 and connected integral with each other by a cross member 13, and is moved along guide 10 in a horizontal direction 14 by a drive device 15 comprising, for each sleeve 12, a rack and sprocket drive (not shown) powered by a respective motor 16.

Cross member 13 defines the guide of a further slide 17 to which head 7 is suspended, and which is moved in a horizontal direction 18, perpendicular to direction 14, by a drive device 19 comprising a rack and sprocket drive (not shown) powered by a respective motor 20.

Figure 5:
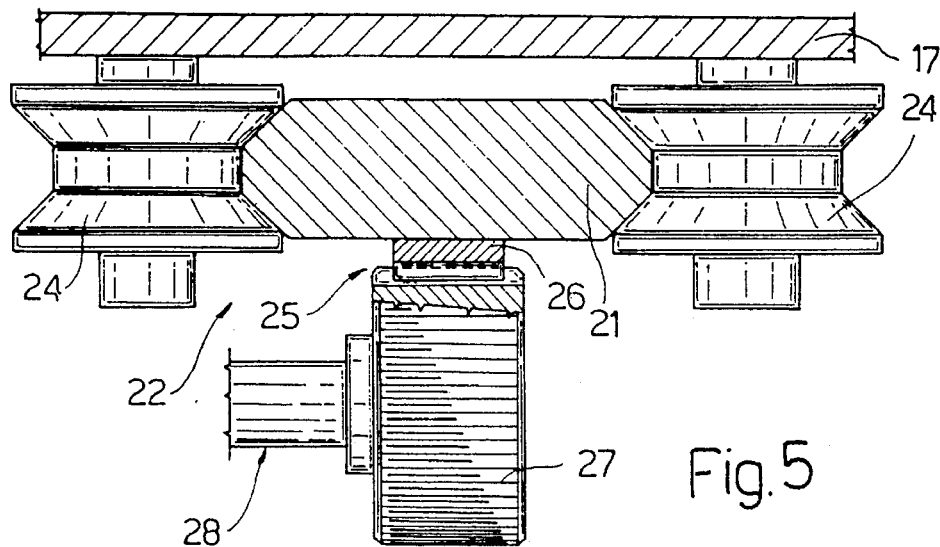
FIG. 5 shows a larger-scale section along line V—V in FIG. 1.

Head 7 is connected to slide 17 by a vertical rod 21 extending downwards through an appendix on slide 17, and movable axially, in relation to slide 17 and by a drive and guide device 22, in a vertical direction 23 perpendicular to directions 14 and 18. As shown particularly in FIG. 5, device 22 comprises a pair of guide rollers 24 located on either side of rod 21 and connected in rotary manner to slide 17; and a rack and sprocket drive 25 in turn comprising a rack 26 connected integral with a lateral surface of rod 21, and a sprocket 27 meshing with rack 26 and fitted to the output shaft of a motor 28 on slide 17.

Figure 2:
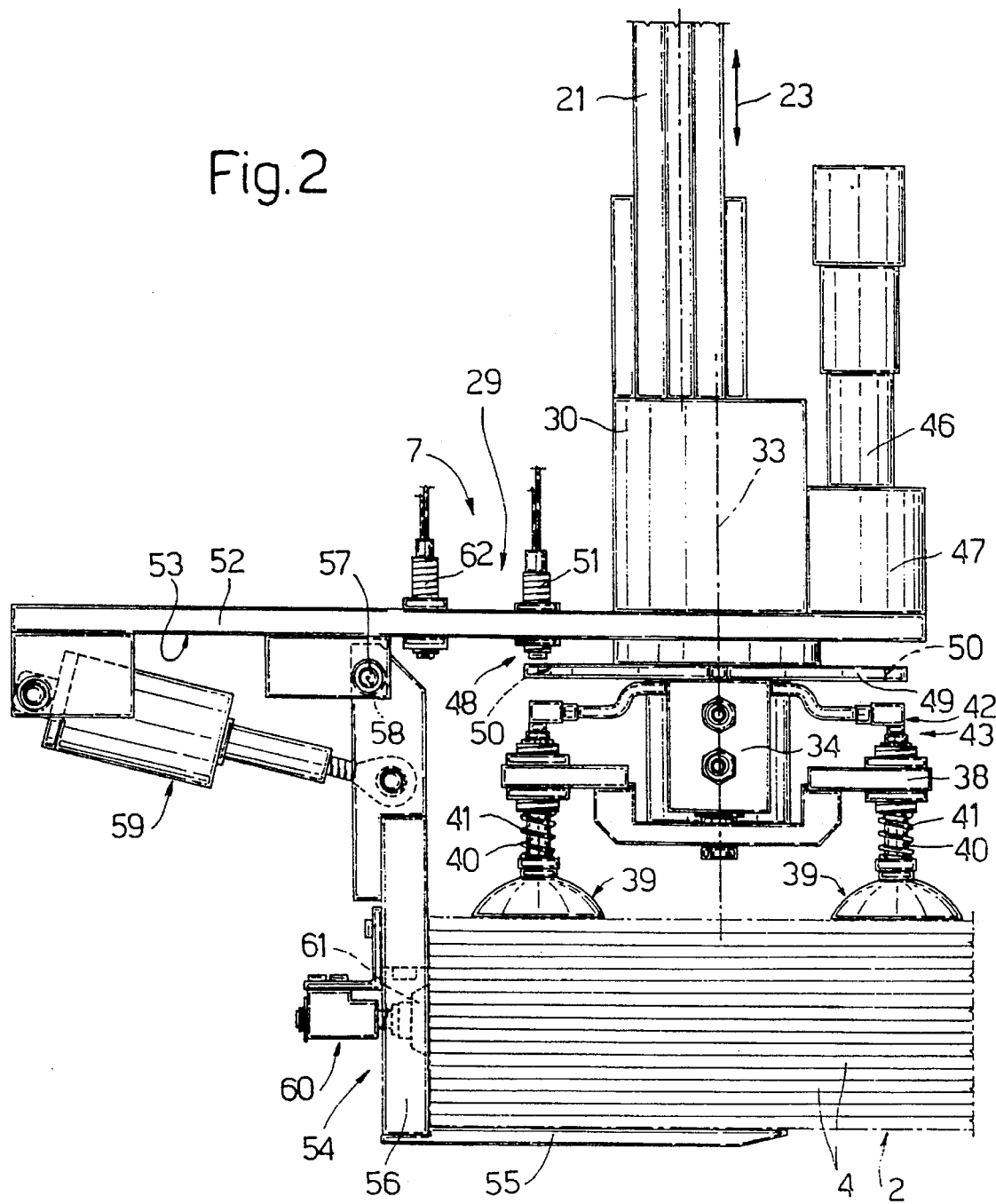
FIG. 2 shows a larger-scale side view of a detail in FIG. 1.
Figure 3:
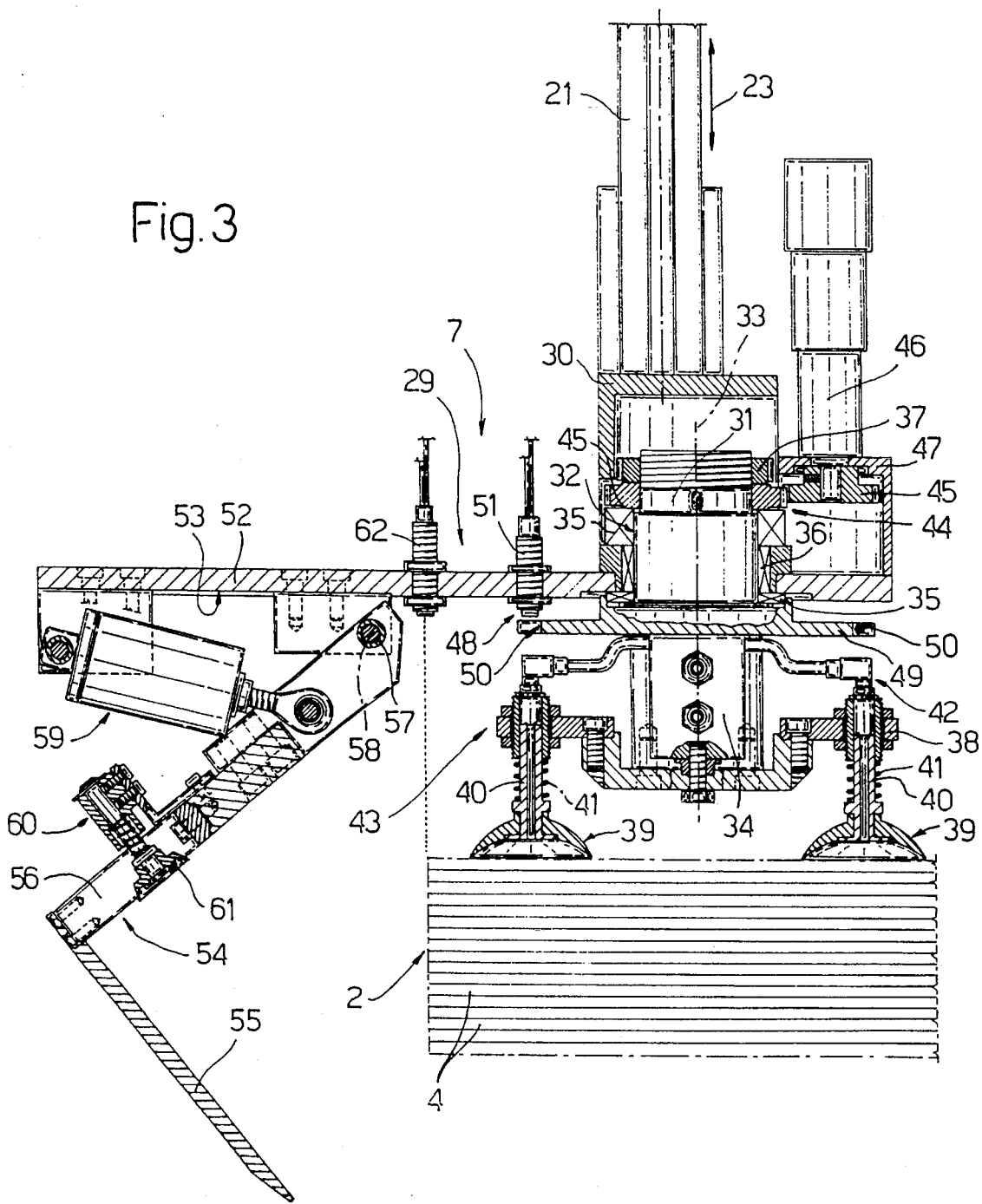
FIG. 3 shows a section of the FIG. 2 detail in a different operating position.
Figure 4:
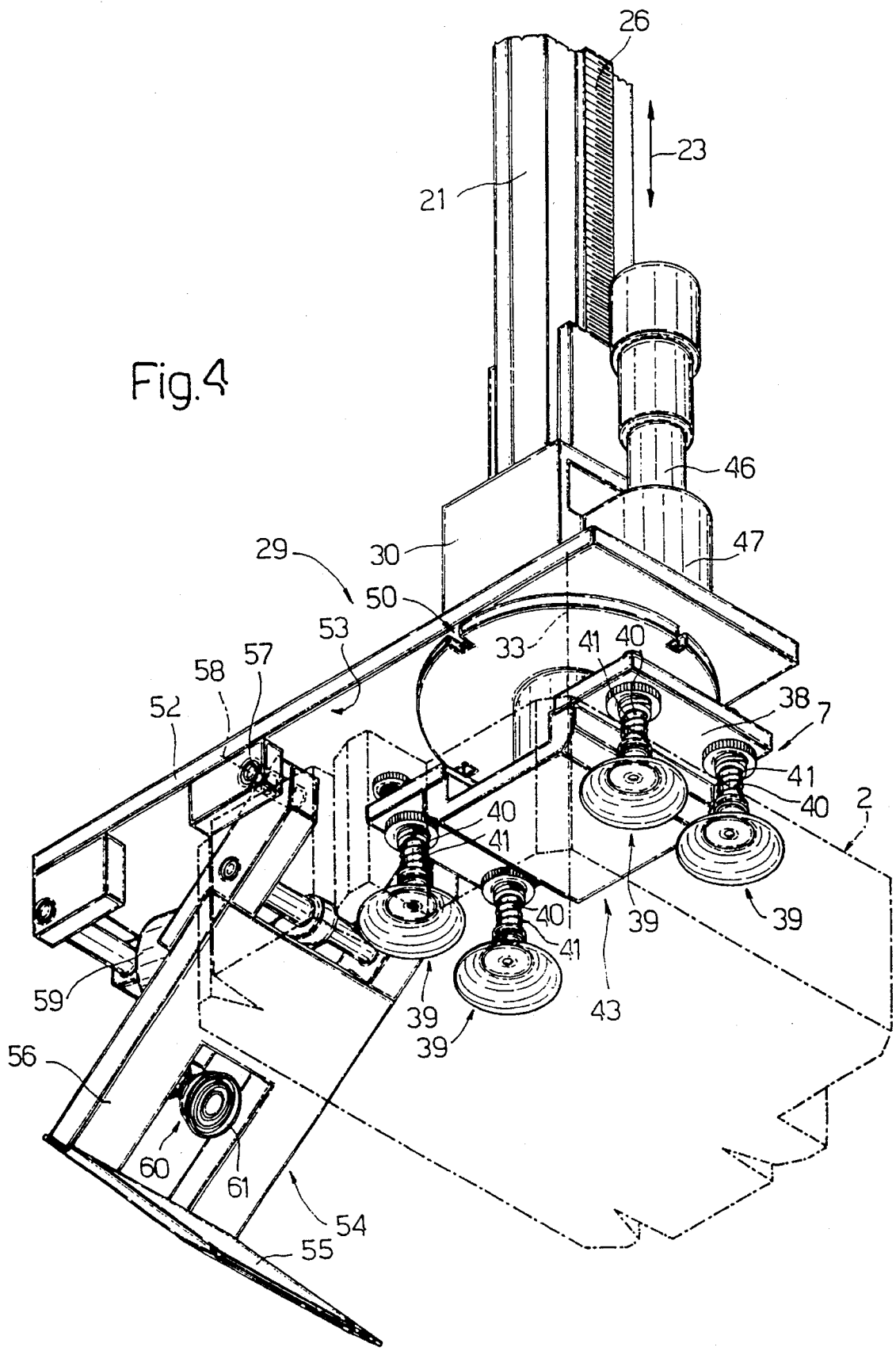
FIG. 4 shows a view in perspective of the FIG. 3 detail.

As shown in FIGS. 2, 3 and 4, head 7 comprises a frame 29 oriented in a direction parallel to direction 14, and in turn comprising a tubular body 30 connected integral with the bottom end portion of rod 21 and housing the top end portion 31 of a substantially cylindrical body 32 having an axis 33 parallel to direction 23. Body 32 also comprises a bottom end portion 34 extending outwards of body 30 and larger in diameter than portion 31; and portion 31 is connected to body 30 in axially-fixed manner and so as to rotate about axis 33 by means of two axial bearings 35 and a radial bearing 36 gripped against portion 34 by a ring nut 37 screwed onto the top end portion of portion 31.

The bottom end of portion 34 is fitted integral with a plate 38 forming part of frame 29 and in turn fitted with four suction cups 39 for positively engaging the band (not shown) of stack 2 for pickup. More specifically, each suction cup 39 is connected to plate 38 by a hollow rod 40, one end portion of which is fitted integral with respective suction cup 39, and the opposite end portion of which engages in axially-sliding manner a respective sleeve integral with plate 38. Each suction cup 39 is maintained a given distance from plate 38 by a respective reaction spring 41 fitted onto respective rod 40, and communicates with a known suction device 42 of which rod 40 forms the end portion.

Body 32 and suction cups 39 constitute a pickup device 43 rotated about axis 33 and in relation to frame 29 by a gear drive 44 comprising two gears 45 meshing with each other, and one of which is fitted to portion 31, between ring nut 37 and adjacent bearing 35, while the other is fitted to the output shaft of a motor 46 and housed in a fixed support casing 47 integral with body 32 and forming part of frame 29.

The angular position of body 32, and hence suction cups 39, in relation to frame 29 is detected by means of a detecting device 48 comprising an indexed annular body 49 integral with portion 34 and having four radial notches 50 equally spaced about its outer periphery; and a sensor 51 for detecting notches 50 and cooperating with a known control system (not shown).

Frame 29 also comprises a plate 52 connected integral with body 30, and projecting from body 30, perpendicular to axis 33, to support sensor 51 facing body 49. On surface 53 facing suction cups 39, plate 52 is also fitted with a fork 54 for supporting stack 2 engaged by suction cups 39. Fork 54 is L-shaped, and comprises a substantially rectangular plate 55 for supporting stack 2; and an upright 56, one end of which is connected integral with plate 55, and the opposite end of which is hinged by a pin 57 to a bracket integral with surface 53, so as to rotate, in relation to plate 52, about an axis 58 perpendicular to axis 33. Fork 54 forms part of frame 29, and is rotated about axis 58, by a linear actuator 59 interposed between plate 52 and upright 56, between an operating position (FIG. 2) wherein plate 55 extends facing suction cups 39, and an idle position (FIG. 3) wherein plate 55 extends to the side of suction cups 39.

Fork 54 presents a positioning element 60 comprising a head 61 projecting outwards of upright 56 and cooperating with a lateral surface of stack 2 engaged by pickup device 43, so as to position the stack correctly on plate 55 as determined by a further sensor 62 fitted through plate 52.

As shown in FIG. 1, device 1 comprises a transfer unit 63 for receiving from head 7 a stack 2 supported on fork 54 and retained by suction cups 39, and transferring stack 2 to a user machine (not shown). More specifically, unit 63 comprises a receiving member 64 consisting of a substantially parallelepiped pocket element sized to house stack 2 and open at the top and on the side facing head 7. Member 64 is oriented in a direction parallel to direction 14, and comprises a U-shaped lateral wall 65 open on the side facing frame 29; and a bottom wall defined by two horizontal plates 66 parallel to each other and separated by a distance, measured in a direction parallel to direction 18, greater than the width of plate 55 measured in the same direction. Member 64 is moved in a direction parallel to direction 18 by a drive device 67 comprising a guide defined by a rod 68 connected integral with one of rods 9 and parallel to cross member 13; and a slide 69 moved along rod 68 by a rack and sprocket drive (not shown) powered by a motor 70. Member 64 is connected to slide 69 by a vertical supporting rod 71 which presents a bottom end portion connected integral with wall 65, and is connected to slide 69 so as to move axially in relation to it by virtue of a rack and sprocket drive (not shown) powered by a motor 72.

Operation of unit 1 will now be described as of the condition in which pallet 3 is located in a predetermined position between posts 8; stacks 2 of blanks 4 are arranged on pallet 3 in predetermined positions, with blanks 4 oriented in predetermined manner; a known control system (not shown) is set to control motors 16, 20, 28, 46 as a function of the position, known to the control system, of pallet 3, and as a function of the arrangement, also known to the control system, of stacks 2 on pallet 3; head 7 is raised over stacks 2; and fork 54 of head 7 is set to the idle position.

As of the above condition, to pick up, for example, a stack 2a located in middle row 5 (FIGS. 1 and 6) and oriented the same way, on pallet 3, as required for loading onto receiving member 64, the control system (not shown) first moves head 7 over stack 2a by operating motors 16 and 20 so as to align axis 33 with a known axis 33a of stack 2a (FIG. 6), and then operates motor 28 and suction device 42 so as to move head 7 towards stack 2a and positively engage stack 2a with suction cups 39. At this point, motor 28 is reversed; head 7 is raised to detach stack 2a engaged and retained by suction cups 39; actuator 59 is operated to move fork 54 into the operating position; and, at the same time, suction device 42 is deactivated to allow stack 2a to rest on plate 55 and, if necessary, be positioned correctly on plate 55 by positioning element 60. At this point, motors 16 and 20 are again operated; and stack 2a is first moved towards member 64, and then deposited inside member 64 by which it is fed in known manner to a user machine (not shown).

Conversely, to pick up a stack 2b (FIGS. 1 and 6) located in a lateral row 5 and oriented, on pallet 3, in other than the required position for loading onto receiving member 64 (more specifically, rotated 90° anticlockwise in FIG. 6), this is done in the same way as described above relative to stack 2a, except that pickup device 43 of head 7, once positioned with its axis 33 aligned with axis 33b of stack 2b, is rotated, under control of device 48, 90° anticlockwise (in FIG. 6) prior to engaging stack 2b with suction cups 39, and is then rotated 90° clockwise (in FIG. 6) prior to releasing stack 2b on plate 55 by deactivating suction device 42.

We claim:

1. A pickup and feed unit for stacks (2) of blanks, the unit comprising:

a first frame (6) capable of being positioned above the stacks of blanks;

a powered pickup head (7) supported by said first frame (6);

means for positioning said powered pickup head in three dimensions with respect to said first frame;

a receiving member (64) supported by the first frame (6); and means for positioning said receiving member with respect to said first frame;

wherein said powered pickup head (7) further comprises:
   a second frame (29) attached to said first frame (6);
   a pickup means (43) downwardly depending from said second frame (29);
   means for rotating said pickup means (43), in relation to the second frame (29), about a vertical axis (33);
   a movable fork element (54) downwardly depending from said second frame (29) and pivotally mounted for rotation about a horizontal axis (58) in relation to said second frame; and
   means for pivotally rotating said fork element (54) about said horizontal axis (58) between an idle position and an operating position, and for selectively positioning said fork element (54) at one of said positions, wherein at least a portion of said movable fork element (54) extends substantially horizontally below said pickup means (43) in said operating position, and wherein said movable fork element (54) does not extend below said pickup means (43) in said idle position;

whereby said movable fork element (54) is capable of being pivotally rotated and selectively positioned into said idle position, said powered pickup head (7) is capable of being positioned above a selected one of said stacks (2), said pickup means (43) is capable of picking up said selected stack off a supporting surface (3) on which the stacks (2) are arranged and oriented in a given manner and capable of engaging said selected stack, said pickup means (43) engaging said selected stack is capable of being rotated to a selected orientation in relation to said second frame (29) and said receiving member (64), said movable fork element (54) is capable of being pivotally rotated and selectively positioned into said operating position, said pickup means (43) is capable of releasing said selected stack onto at least a portion of said movable fork element (54) thereby supporting said selected stack, and said powered pickup head (7) is capable of transporting said selected stack onto said receiving member (64); and whereby said unit is capable of successively picking up a remainder of said stacks (2).

2. The unit as claimed in claim 1 wherein said movable fork element (54) further comprises: a plate (55) capable of extending substantially horizontally and capable of supporting said selected stack in said operating position, wherein at least a portion of said plate is disposed vertically beneath said pickup means (43) in said operating position; and an upright member (56) integrally connected with said plate (55) at one end and hingedly connected to said second frame (29) at another end, wherein said plate (55) and said upright member (56) are formed substantially in an L-shape.

3. The unit as claimed in any one of the foregoing claims wherein said pickup means (43) further comprises a suction cup means (39).

4. The unit as claimed in claim 3, further comprising detecting means (48) for detecting an angular position of the pickup means (43) about said vertical axis (33).

5. The unit as claimed in claim 4, wherein said second frame (29) further comprises a tubular first body (30) coaxial with said vertical axis (33); wherein said pickup means (43) further comprises a second body (32) coaxial with said vertical axis (33) and engaging said first body (30) in a rotary and axially-fixed manner; and wherein said means for rotating said pickup means further comprises a drive means (46, 44) for rotating the second body (32) in relation to the first body (30) and about said vertical axis (33).

6. The unit as claimed in claim 4, wherein said suction cup means (39) provides suction force in an upward direction that coincides with said vertical axis (33).

7. The unit as claimed in claim 2 wherein said second frame (29) further comprises a position detecting means (48) for determining a position of said selected stack; and wherein said movable fork element (54) further comprises a movable head element (61) capable of projecting outward from said upright member (56) for adjusting said selected stack engaged by said pickup means (43), so as to subsequently position said stack on said plate (55) as determined by said position detecting means (48).

8. The unit as claimed in claim 1, wherein said receiving member (64) is movable in two different orthogonal directions in relation to said first frame (6).

\* \* \* \* \*